United States Patent [19]

Hawes

[11] Patent Number: 4,593,523

[45] Date of Patent: Jun. 10, 1986

[54] METHOD AND APPARATUS FOR ACCELERATION LIMITING A GAS TURBINE ENGINE

[75] Inventor: David J. Hawes, Pierrefonds, Canada

[73] Assignee: Allied Corporation, Morris Township, Morris County, N.J.

[21] Appl. No.: 510,124

[22] Filed: Jul. 1, 1983

Related U.S. Application Data

[63] Continuation of Ser. No. 217,374, Dec. 17, 1980, abandoned.

[51] Int. Cl.[4] .............................................. F02C 9/28
[52] U.S. Cl. ................................................ 60/39.281
[58] Field of Search .................................... 60/39.281

[56] References Cited

U.S. PATENT DOCUMENTS

| | | |
|---|---|---|
| 3,006,144 | 10/1961 | Arnett et al. . |
| 3,152,444 | 10/1964 | Peczkowski et al. . |
| 3,393,691 | 7/1968 | Longstreet et al. . |
| 3,587,229 | 6/1971 | Peczkowski . |
| 3,832,846 | 9/1974 | Leeson . |
| 3,888,078 | 6/1975 | Greune et al. . |
| 3,956,884 | 5/1976 | Eves ................................ 60/39.281 |
| 4,018,044 | 4/1977 | Joby et al. . |
| 4,040,250 | 8/1977 | Saunders et al. . |
| 4,045,955 | 9/1977 | Brannstrom et al. . |
| 4,100,731 | 7/1978 | Janes et al. . |
| 4,134,257 | 1/1979 | Riple . |
| 4,171,613 | 10/1979 | Schmidt-Roedenbeck et al. . |
| 4,188,781 | 2/1980 | Johnson et al. . |
| 4,423,592 | 1/1984 | Evans ............................... 60/39.281 |

OTHER PUBLICATIONS

"SD Series" Controls for Aero-Engines-D. A. Caine--Nov. 1975.
Digital Control for Helicopter Powerplants-D. A. Caine & S. Janik-Nov. 1979.
NDEC-A Control Concept for Helicopter Gas Turbines-D. J. Hawes & R. M. Evans-May 1980.

Primary Examiner—Louis J. Casaregola
Attorney, Agent, or Firm—Stan Protigal; Howard Massung

[57] ABSTRACT

A method and apparatus for acceleration limiting a gas turbine engine (10) is disclosed. A proportional fuel control (11) regulates the fuel flow Wf from a hydromechanical unit (36) based upon an error signal E representing the difference between a demanded speed signal Nd and an actual speed signal Ng. The demanded speed signal Nd is generated by an integrator (32) as the time integral of the difference between the demanded signal Nd and a scheduled speed signal Ngs. Additionally, the difference signal is limited between an upper limit A1 and a lower limit D1 prior to the integration by a comparator (28) and a limiter circuit (30). The acceleration limit, A1 is generated as a function of a nondimensional parameter ratio (dN/dt×N)/Wf.

6 Claims, 10 Drawing Figures

METHOD AND APPARATUS FOR ACCELERATION LIMITING A GAS TURBINE ENGINE

This is a continuation of application Ser. No. 217,374 filed Dec. 17, 1980, abandoned.

BACKGROUND OF THE INVENTION

The invention relates to method and apparatus for acceleration limiting a gas turbine engine and is more particularly directed to generating an acceleration limit as a nondimensional limit function independently of a pressure measurement.

The closed loop fuel control of gas turbine engines based on acceleration has become successfully implemented in various systems. These systems act directly to control the rate of change of the engine speed as a function of an acceleration term. The acceleration term is formed by differencing a scheduled term with an actual or an implied actual parameter of the gas generator. The actual acceleration of the engine is fed back through changes in the actual term for comparison with the scheduled term. The acceleration term, which after an integration effectively provides a datum for a proportional speed control loop, may, therefore, be a function of any of a number of control input parameters including engine speed, ambient pressure, temperature, compressor pressure, etc. Advantages of this form of acceleration control include consistent predictable accelerations which take account of fuel type, temperature, and altitude. The acceleration time is also generally independent of air bleed and power extraction status.

A closed loop fuel control for a gas turbine engine based on acceleration is more fully disclosed in U.S. patent application Ser. No. 210,938, filed in the name of Roland M. Evans on Nov. 28, 1980 (U.S. Pat. No. 4,423,592), which is commonly assigned with the present application. The disclosure of Evans is hereby expressly incorporated by reference herein. Other examples of closed loop systems of this type are illustrated in U.S. Pat. Nos. 4,018,044; 4,100,731; and 4,040,250.

The acceleration that is requested should be a function of the final desired output power or speed. Generally, it is desired that an acceleration be the safe maximum available from the engine for the particular operating conditions of the engine. Only the physical limitations of the engine should reduce the acceleration capability of the control. One set of acceleration limiting conditions is where the compressor begins to stall and the engine enters a surge condition destructive to the equipment. Therefore, the acceleration and fuel flow must be controlled so that a safe operating margin is maintained between stall conditions and the operating point so the engine does not encounter these problems. On most controls, an acceleration limiter, producing predetermined acceleration limits, is utilized to control the safety factor. When on acceleration limit, the fuel flow to the engine is scheduled by the acceleration limiter without regard to the steady running line of the engine.

Normally, this margin of safety is defined in terms of a surge line representing an acceleration limit which, if not exceeded, will help prevent the engine from stalling. Typically, the surge line has been defined as an open loop schedule in terms of parameter groups such as the fuel/air ratio of the engine $(Wf/(Pc\sqrt{To}))$ versus the gas generator speed $(N/\sqrt{To})$. When defined in this manner, the parameter groups are "nondimensional" (lacking only a geometrical scaling factor) and generally apply to all engines of the particular type for which the stall line was determined. A new schedule does not have to be developed every time an engine dimension is modified and is equally adaptable to all engines regardless of size of that design. The new schedules are merely scaled versions of the previous schedules based on the engine size changes.

For closed loop controls based upon acceleration, another parameter group that is frequently used to limit acceleration is $(dN/dt)/Po$ where $dN/dt$ is the acceleration limit of the engine, and $Po$ the ambient pressure. While reducing the accuracy requirements somewhat as compared to an open-loop scheduling system, this method still requires the measurement of pressure. This measurement is comparatively expensive and unreliable to transduce electronically to the required accuracy over the environmental envelope of an aircraft gas turbine engine. Therefore, it would be highly desirable to provide a method and apparatus generating a scheduled acceleration limit for a closed loop fuel control system without the measurement of a pressure. It would, additionally, be highly desirable to generate the acceleration limit as a group of parameters that form a "nondimensional" ratio.

SUMMARY OF THE INVENTION

The invention provides an improved method and apparatus for generating an acceleration limit for a gas turbine engine fuel control without the measurement of pressure. It is a primary advantage of the invention to generate the acceleration limit as a "nondimensional" ratio.

In a preferred embodiment an acceleration term is formed by a fuel control in a closed loop manner. The acceleration term is integrated to yield a demanded speed signal which is a datum to which a proportional speed loop is slaved. The demanded velocity is subsequently differenced with the actual velocity in the proportional loop to control the fuel flow to the engine. Before integration, an acceleration limiter compares the acceleration term to upper and lower acceleration limits defining acceptable boundaries for the parameter. The antisurge limits are variable and are modified according to the operating conditions of the engine.

The acceleration limit is generated from a function defining the surge boundary of the engine in terms of $Wf$, $N$, and $dN/dt$ where $Wf$ is the fuel flow to the engine, $N$ is the rotational velocity of the rotor, and $dN/dt$ the acceleration of the rotor. Particularly, an array of $(dN/dt \times N)/Wf$ values versus $N/\sqrt{\theta}$ can be stored in a memory device and those values read out on command for any particular corrected speed. These values when multiplied by the fuel flow, $Wf$, and divided by the speed $N$ yield an acceleration limit directly.

The acceleration limit when defined by the ratio $(dN/dt \times N)/Wf$ is dimensionless. An acceleration multiplied by a speed produces a term in the numerator that is equivalent to excess torque or engine power. Similarly, the denominator $Wf$ can be thought of as engine power when the fuel flow is converted into units of B.T.U.s or heat energy. Taking the ratio or dividing a power term by a power term cancels the dimensions from the ratio. Thus, an advantage of the invention is that the same acceleration limiter can then be used for any engine of a particular type, regardless of dimension change by scaling the schedule to the size change.

Further, a highly accurate electronic transduction of an engine or ambient pressure over the significant environmental envelope of a turbojet engine is unnecessary for the control. This eliminates the need for costly pressure transducers and the highly complex compensation circuits and equipment that usually accompany them.

Additionally, a second correction matrix is provided where second order factors that affect the surge margin of the engine can be utilized to modify the acceleration limit. The second order factors compensated for can be gas generator speed, ambient temperature, and ambient pressures. Further, "dimensional" effects such as low compressor Reynolds numbers and variable geometry can be corrected for in this manner. Since the primary effect of pressure changes, i.e., altitude differences, have been compensated for in the acceleration term, the pressure transducers for the correction circuit have considerably reduced accuracy requirements. In a preferred form the transducers can be simple bilevel transducers to signal a change from a region or a condition that may necessitate further acceleration limit correction.

In particular, schedules are formed for high Reynolds numbers as a function of ambient pressure Po and ambient temperature To. Another schedule provides for anti-icing needs as a function of bleed valve position Bp. Still another schedule is provided for operation as a function of the variable geometry position Gp.

These and other objects, features, and aspects of the invention will be better understood and more clearly described if a reading of the detailed description is undertaken in conjunction with the appended drawings wherein:

BRIEF DESCRIPTION OF THE DRAWNGS

FIG. 10 is a graphical representation of still another value of the multiplication factor which is output from the correction matrix illustrated in FIG. 3 as a function of ambient temperature To.

DETAILED DESCRIPTION OF THE PREFERRED EMBODIMENTS

Figure 1:
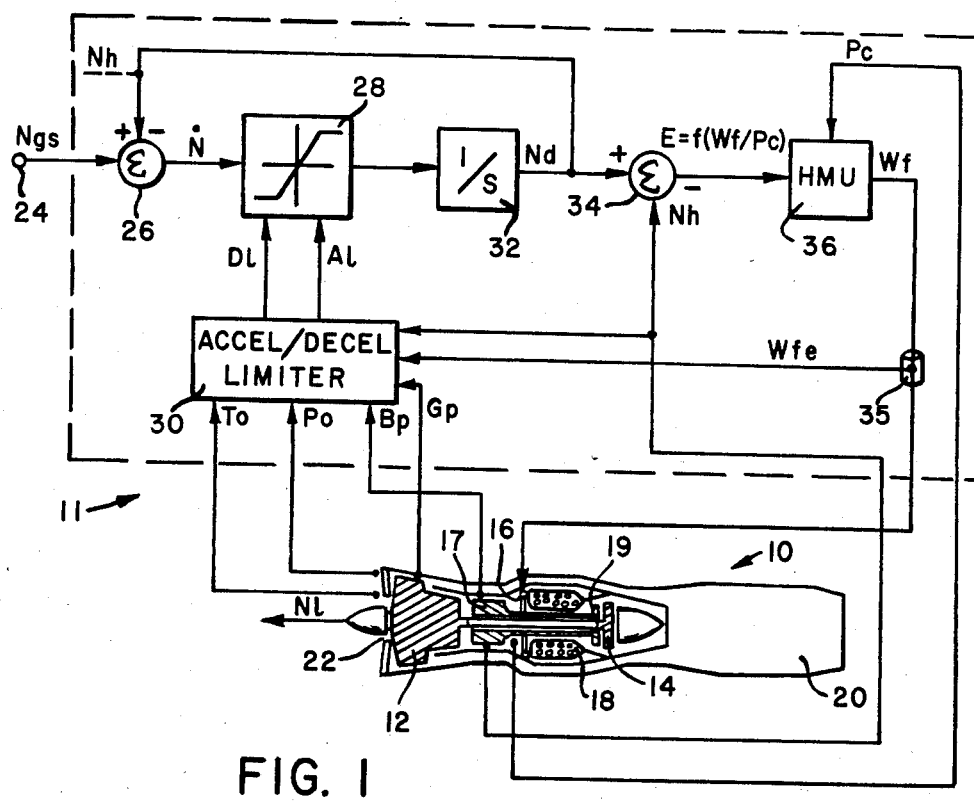
FIG. 1 is a system block diagrammatic view of a fuel control system for a turbojet engine which is constructed in accordance with the teachings of the invention.

With reference to FIG. 1 there is shown a fuel control system 11 for a turbojet engine which is generally designated 10. The engine 10 includes an intake duct 22 through which air enters. After entering the engine, the air is compressed by a low pressure compressor 12 and subsequently by a high pressure compressor 17. Compressors 12 and 17 are of the axial type which produce an increase in pressure and consequently, an increase in the density of the incoming air proportional to their speed. The denser air moves to a fuel supply section where a fuel ring 16 produces a combustible fuel/air mixture by spraying fuel into the incoming stream. The fuel/air mixture is thereafter ignited and combusted in burners 18 to produce a high velocity exhaust gas. The exhaust gas, as is conventional in this type of reaction engine, exits through a nozzle 20 to produce a forward thrust. A portion of the energy contained in the exhaust gas is expended in rotating a low pressure turbine 14 and a high pressure turbine 19 which are physically attached to the respective compressors by concentrically disposed rotor shafts. Each compressor and turbine combination form a spool which rotates independently from the other. The engine described is a conventional two-spool turbojet engine in which the second or low pressure spool has been added to increase the efficiency of the engine.

Generally, the control of the engine speed and thus output power or thrust of the engine is regulated by the amount of fuel flowing through the fuel ring 16. This fuel flow Wf is modulated by the fuel control 11 to provide more or less energy and thus reaction power from the engine. Increasing the fuel flow increases the engine speed and output power while decreasing the fuel flow decreases engine speed and output power.

The fuel control system 11 is provided for assuring that control of the engine speed is maintained during steady state operation, accelerations and decelerations. The fuel control illustrated is based on an input to terminal 24 which is the desired or scheduled rotational speed Ngs, of one of the compressor and turbine combinations of the engine 10. The signal Ngs can, for example, be generated as the output from a schedule based on the power lever angle of the particular device the engine is used on. In its simplest form the Ngs signal can be generated from a potentiometer that is ganged to the power lever.

When referring to the engine speed, either the high pressure compressor speed (high spool speed Nh) or the low pressure compressor speed (low spool speed N) is meant because either can be used to control the engine. In this particular embodiment the controlling parameter of the fuel control will be the high spool speed Nh. The high spool speed is chosen as the controlling parameter in this type of engine since it is the more critical to the operation.

By scheduling the commanded speed Ngs to terminal 24 any desired engine power may be obtained since the fuel control varies the power of the gas turbine engine by regulating engine speed. Thus, the control system operates to govern the engine speed as a function of the scheduled speed Ngs and accelerates or decelerates the engine in a manner to reach a new scheduled speed when the pilot or another system component changes the scheduled engine speed. Otherwise, for changes in engine environment such as altitude, temperature, pressure or other factors, the governor acts to maintain the scheduled speed Ngs.

To control accelerations or decelerations, the fuel control forms an acceleration term which is preferably the difference of the scheduled speed Ngs and a demanded speed term Nd. Alternatively, the acceleration term can be formed as the difference between the high spool speed signal Nh and the scheduled speed signal Ngs. The advantages of forming the acceleration term as a function of the demanded speed signal Nd are set forth in the referenced Evans application. This function is performed by feeding the two chosen parameters to a first summing junction 26 and generating a difference signal of sign and magnitude equivalent to the difference therebetween. The acceleration term or difference signal is integrated in an integrator 32 to become the demanded speed signal Nd. This portion of the control forms an integral loop providing a datum which is the demanded speed signal Nd.

The acceleration term is conventionally limited by a comparator circuit 28. The comparator 28 compares the acceleration term to an upper limit A1 and a lower limit D1 and passes the acceleration term unmodified if between the two values. However, if the acceleration is great enough to cause surge, the acceleration term will be limited at the upper acceleration limit A1, while if the deceleration is sufficient to cause flame out it will be limited at the lower deceleration limit D1.

An accel/decel limiter circuit 30 as will be more fully described hereinafter is used to generate the variable limits and to modify the limits as a function of a group of operating parameters of the engine. An acceleration limit schedule is stored in a memory device of the circuit where the schedule is substantially equivalent to the steady state surge line of the particular engine expressed as a function of the engine operating parameters chosen.

For a first implementation the schedule is formed as a function of the corrected speed $N/\sqrt{\theta}$ input through the combination of the high spool speed signal Nh and a signal, To, from a temperature sensor representative of the ambient temperature. As is known the corrected speed is inversely proportional to the square root of ambient temperature. Other inputs for this implementation are an electrical signal Wfe which is representative of the fuel flow as measured by a flow sensor 35 or alternatively, as the fuel metering valve position.

In a second implementation the fuel flow signal Wfe, and high spool speed Nh are used to generate a scheduled value which is corrected by a multiplication factor. The multiplication factor is scheduled as a function of the temperature signal To, a signal Po from a pressure sensor indicative of the ambient pressure, a signal Gp from a position sensor indicative of the position of the variable geometry of the low speed compressor, and a signal Bp from a position sensor indicative of the position of the bleed valves of the high pressure compressor. The position, temperature, flow, and pressure sensors are devices that transduce the respective physical parameters into an electrical signal for further processing. As such, these devices are well known in the art and have only been shown schematically.

Thereafter, the demanded speed signal Nd is differenced with the high spool speed Nh in a second summing circuit 34. The error signal E generated by this difference is then used to proportionally control the fuel flow to the engine 10 in a direction tending to null the error between the scheduled speed signal Ngs and the demanded speed signal Nd. In this manner this portion of the controller forms a proportional control loop slaved to the datum Nd. For changes in the datum Nd the actual engine speed Ng will change to where there is a steady state error E supporting that particular demanded speed.

The proportional control is developed by a hydromechanical unit (HMU) 36 which receives as an input the error signal E. The HMU 36 multiplies the error signal E by a predetermined gain to provide a fuel flow Wf which is proportional to the error signal. In its simplest form, if the error signal E is electrical, the HMU could be implemented as a proportional solenoid valve which changes position with respect to a control voltage representative of the error signal to regulate fuel flow from a pressurized fuel source. The HMU 36 would, therefore, also consist of a pressure regulator and a pressurized source of fuel (not shown) as is conventionally known in the art.

Additionally, the HMU 36 can include means for mechanically multiplying the error signal E by an input representative of the output of the compressor stages, compressor pressure Pc. In combination with the proportional solenoid, the multiplying means could comprise a multiplying piston coupled to the fuel valve which transduces the compressor pressure Pc into a force to assist the solenoid. Thus, the error signal E at all engine operating points is proportional to Wf/Pc or the fuel/air ratio of the engine. Because of this mechanical multiplication, the error signal E can be thought of as being generated as a function of the fuel/air ratio of the engine. Normally, this would make the scheduling of the speed signal Ngs much easier to implement.

The accel/decel limited circuit will now be more fully described. Preferably, the limiter circuit comprises an acceleration portion and a deceleration portion with a means for generating each of the limits A1, D1. For the particular implementation of FIG. 1, the deceleration limit D1 can be a constant and transmitted to the comparator circuit 28 as a reference voltage. Alternatively, the deceleration limit D1 can be an inversion of the acceleration limit A1 below the steady state running line.

The acceleration portion of the accel/decel limiter circuit is better illustrated with reference to FIG. 2. There the generation of the acceleration limit, A1, as a function of fuel flow, Wf, engine speed N, and acceleration dN/dt is shown. The acceleration is represented by the usual engineering character "N-dot" in the drawings. The limit is calculated by first scheduling a value of a parameter ratio defined by $(dN/dt \times N)/Wf$ as a function of corrected engine speed $N/\sqrt{\theta}$. These values are stored in a memory of a scheduling circuit 50. The circuit 50 when addressed by values of the corrected speed input via lead 52 transmits values of the ratio to the input of a multiplier circuit 56. The multiplier circuit 56 receives at its other input the signal Wfe representing the fuel flow and generates the product of the two factors as an output to lead 60. A divider 61 divides this product by the corrected speed to yield an output on lead 63. The quotient, acceleration limit A1, is then transmitted to the comparator circuit 28 to modify the acceleration term in the manner previously described via lead 63.

Figure 4:
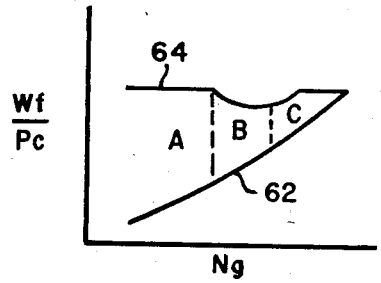
FIG. 4 is a graphical representation of the steady state operating curve and acceleration schedule of a typical gas turbine engine expressed in terms of the fuel/air ratio Wf/Pc as a function of engine speed N.
Figure 5:
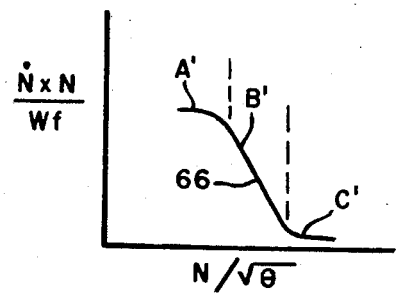
FIG. 5 is a graphical representation of an acceleration schedule of a typical gas turbine engine expressed in terms of a nondimensional acceleration ratio $(dN/dt \times N)/Wf$ as a function of corrected engine speed $N/\sqrt{\theta}$.

The preferred functional relationship of the parameter ratio to corrected engine speed is disclosed in FIG. 5 where curve 66 illustrates the acceleration schedule of a particular engine in terms of the preferred nondimensional ratio. This schedule is substantially equivalent to the steady state stall line of an engine with a margin of safety separating them. Evidence that curve 66 is representative of a generalized acceleration schedule for a typical engine is seen by comparing this curve with FIG. 4. In FIG. 4, the fuel/air ratio Wf/Pc of the engine is graphically illustrated as a function of corrected engine speed. A conventional steady state running line of the engine is shown as curve 62 and the stall boundary as curve 64. These generalized forms for these curves are well known and conventional in the art. The acceleration margin of the engine is that permissible overfueling or excess fuel/air ratio area between the steady running line and the stall boundary. The overfueling in excess of steady state will produce a related acceleration and can be imagined as an acceleration limit.

It is seen that there are three relatively distinct regions: A, B, and C, that can be categorized broadly as low, middle, high ranges of engine speed. From inspection, region A has a relatively large acceleration margin that decreases slightly with increases in speed; region B has a more rapidly decreasing acceleration margin; and region C has a smaller, but still decreasing acceleration margin. These regions of FIG. 4 correspond to the acceleration limit regions A', B', C' in FIG. 5, which are similar in behavior. Region A' provides a relatively large acceleration limit which decreases with a small slope, region B' has a greater slope and the acceleration parameter falls off faster, and region C' produces a substantially small acceleration limit which falls off with less slope.

Additionally, it is seen that when represented in these terms the acceleration parameter can be generated in a simplified approximated form by three straight lines of the correct slope. Moreover, by varying the slopes of each segment, a generalized method for fitting the acceleration parameter to the stall margin of different engines can be obtained.

Figure 2:
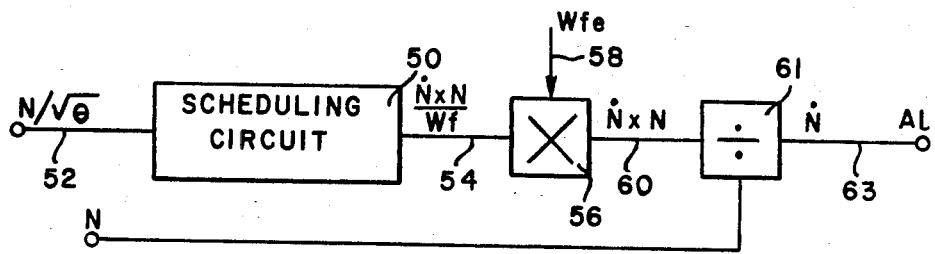
FIG. 2 is a detailed block diagrammatic view of a first implementation of the acceleration limit generating portion of the accel/decel limiter circuit illustrated in FIG. 1.
Figure 3:
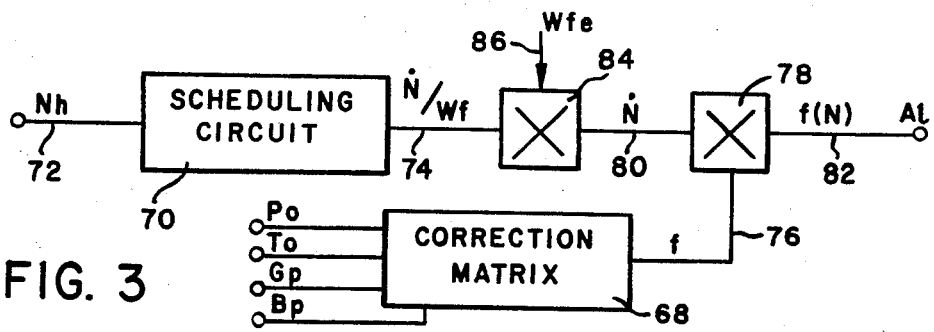
FIG. 3 is a detailed block diagrammatic view of a second implementation of the acceleration limit generating portion of the accel/decel limiter circuit illustrated in FIG. 1.

In FIG. 3 a scheduling circuit 70 and a multiplier 84 identical to that illustrated in FIG. 2 are shown as the basis for a second implementation of the acceleration portion of the accel/decel circuit 30. In this schedule the nondimensional parameter ratio is defined as $(dN/dt)/Wf$. This ratio is input to the multiplier 84, multiplied by Wfe, and the product which is representative of the acceleration limit output to a second multiplier 78. The acceleration limit, dN/dt, output from terminal 80 is modified by multiplication by a correction factor f input to multiplier 78 via lead 76. The output of the multiplier, lead 82, transmits the corrected acceleration limit A1 to the comparator 28.

Figure 6:
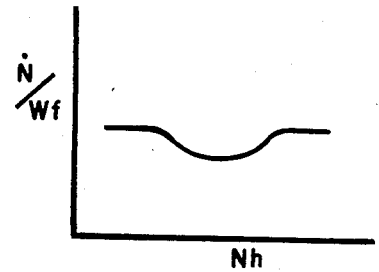
FIG. 6 is a graphical representation of an acceleration schedule of a typical gas turbine engine expressed in terms of a ratio $(dN/dt)/Wf$ as a function of true speed Ng.

The ratio $(dN/dt)/Wf$ is used in this implementation as a simplification of the embodiment shown in FIG. 2. When the controlling or scheduled parameter of the engine is speed, this simplified form for the ratio can be utilized. This is true because it is evident that for every value of the ratio $(dN/dt \times N)/Wf$ as a function of N, there is a unique value of the ratio $(dN/dt)/Wf$ as a function of Nh. This schedule is illustrated as FIG. 6 in the drawings. Further simplification in this embodiment is shown by the multiplication by true engine speed Nh instead of corrected speed. The temperature correction as will be more fully described hereinafter, can be factored into the limit by the correction matrix 68 through factor f.

The correction factor f is the output of a correction matrix 68 including one or more correction schedules based on various operating parameters of the engine. These various schedules can be independent or all folded into one multivariable look-up table.

Figure 7:
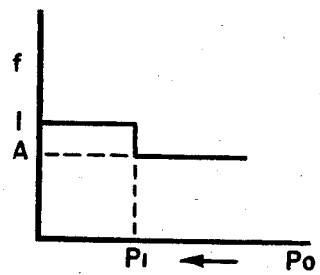
FIG. 7 is a graphical representation of a multiplication factor f which is output from the correction matrix circuit illustrated in FIG. 3 as a function of ambient pressure Po.

In one instance, the factor f is a function of ambient pressure Po as is illustrated in FIG. 7. This schedule would be advantageous for environments where the engine may encounter low Reynolds numbers. These situations are most likely to occur above a flight level of 30,000 ft. and thus, simple bilevel pressure switch could be used to sense this environmental condition as pressure P1. At this reduced pressure, the factor f would be reduced in a stepwise manner from unity to a fraction A.

Figure 8:
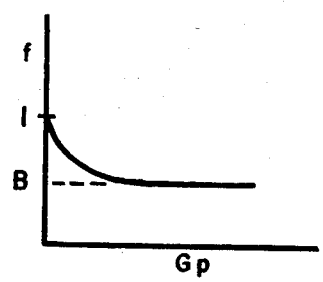
FIG. 8 is a graphical representation of another value of the multiplication factor which is output from the correction matrix circuit illustrated in FIG. 3 as a function of variable geometry position Gp.

Another correction schedule is generated by the correction matrix 68 as a function of the position Gp of the variable geometry of the compressor. This schedule is illustrated in FIG. 8 disclosing that the acceleration limit is set proportionally downward from unity to a fraction B when the acceleration margin is reduced by varying the compressor geometry.

Figure 9:
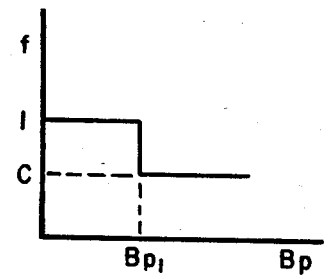
FIG. 9 is a graphical representation of still another value of the multiplication factor f which is output from the correction matrix circuit illustrated in FIG. 3 as a function of bleed valve position Bp.

Still further, the correction matrix 68 includes a schedule illustrated in FIG. 9 for modifying the acceleration limit as a function of the bleed valve position Bp. The curve indicates that the acceleration limit is modified stepwise when heavy loads on the bleed system are imposed. These loads are caused by anti-icing needs and other situations in which large amounts of pressurized air are diverted from the compressor at position Bp1. During these heavy loads the compressor stall margin is reduced and the factor f accordingly reduced from unity to a fraction C.

Figure 10:
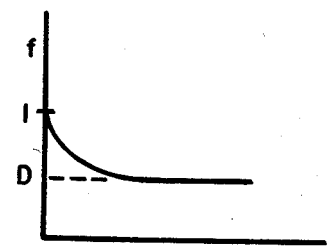

The schedule, illustrated in FIG. 10, describes the proportional decrease in the factor f from unity to a fraction D for variations in the ambient temperature. As temperature increases the acceleration limit is reduced to compensate for the change in compressor efficiency. This schedule is used to correct the speed for temperature and further, to compensate for high Reynolds numbers.

All of the schedules 7 through 10 can, of course, be generalized through the use of more complex functions and have only been shown in a simplified form. Since a look-up table is utilized, empirical schedules, as a function of each of the parameters measured, are within the scope of the invention to provide a correction factor.

While a detailed description of the preferred embodiments and implementations of the invention has been disclosed, it will be obvious to those skilled in the art that various modifications and changes may be made thereto without departing from the spirit and scope of the invention as is hereinafter defined in the appended claims.

What is claimed is:

1. In a fuel control system for a gas turbine engine including: means for generating an actual speed signal proportional to the actual turbine speed of the gas turbine engine; means for generating a scheduled speed signal proportional to a desired engine output power; means for generating a demanded speed signal proportional to the time integral of a difference signal; means for generating said difference signal proportional to the difference between said scheduled speed signal and said demanded speed signal; means for generating an error signal proportional to the difference between said demanded speed signal and said actual speed signal; and means for controlling the fuel flow to the gas turbine engine as a function of said error signal; an improvement comprising:

means for limiting said difference signal to a limit value; and means for generating said limit value as a function of the fuel flow to the engine Wf, and the speed of the engine N;

said limit valve generating means including a memory device for storing a schedule of an acceleration parameter as function of engine speed, wherein said memory device stores values of the ratio $(dN/dt \times N)/Wf$.

2. A fuel control system as defined in claim 1 which further includes:

means for generating a correctional value to be combined with said limit value.

3. A fuel control system as defined in claim 2, wherein:

said correctional value is generated as a function of at least one of the group comprising;

ambient temperature To, variable geometry position Gp, ambient pressure Po, and bleed pressure Bp.

4. In a fuel control system for a gas turbine engine including: means for generating an actual speed signal proportional to the actual turbine speed of the gas turbine engine; means for generating a scheduled speed signal proportional to a desired engine output power; means for generating a demanded speed signal proportional to the time integral of a difference signal; means for generating said difference signal proportional to the difference between scheduled/speed signal and said demanded speed signal; means for generating an error signal proportional to the difference between said demanded speed signal and said actual speed signal; and means for controlling the fuel flow to the gas turbine engine as a function of said error signal; an improvement comprising:

means for limiting said difference signal to a limit value; and means for generating said limit value as a function of the fuel flow to the engine Wf, and the speed of the engine N, said limit value generating means including a memory device for storing a schedule of an acceleration parameter as function of engine speed, wherein said memory device stores values of the ratio $(dN/dt)/Wf$.

5. A fuel control system as defined in claim 4 which further includes:

means for generating a correctional value to be combined with said limit value.

6. A fuel control system as defined in claim 5, wherein:

said correctional value is generated as a function of at least one of the group comprising;

ambient temperature To, variable geometry position Gp, ambient pressure Po, and bleed pressure Bp.

* * * * *